(12) United States Patent
Mattes

(10) Patent No.: US 7,520,487 B2
(45) Date of Patent: Apr. 21, 2009

(54) VALVE ARRANGEMENT WITH PIEZOELECTRIC CONTROL

(75) Inventor: Gerd Mattes, Schorndorf (DE)

(73) Assignee: Karl Dungs GmbH & Co. KG, Urbach (DE)

( * ) Notice: Subject to any disclaimer, the term of this patent is extended or adjusted under 35 U.S.C. 154(b) by 329 days.

(21) Appl. No.: 11/402,360

(22) Filed: Apr. 11, 2006

(65) Prior Publication Data

US 2006/0260701 A1    Nov. 23, 2006

(30) Foreign Application Priority Data

Apr. 22, 2005    (DE) .................... 10 2005 018 730

(51) Int. Cl.
*F16K 31/12* (2006.01)

(52) U.S. Cl. ................. 251/30.02; 251/25; 251/129.06; 137/614

(58) Field of Classification Search ........... 251/25, 251/30.01, 30.02, 129.01, 129.06; 137/613, 137/614, 314.11

See application file for complete search history.

(56) References Cited

U.S. PATENT DOCUMENTS

| | | | | |
|---|---|---|---|---|
| 5,251,148 A | * | 10/1993 | Haines et al. | ................ 700/282 |
| 5,280,773 A | * | 1/1994 | Henkel | ........................ 123/467 |
| 5,343,894 A | * | 9/1994 | Frisch et al. | ........... 137/625.65 |
| 6,357,335 B1 | * | 3/2002 | Lafler et al. | .................... 91/461 |
| 6,848,474 B2 | * | 2/2005 | Sollier | ........................ 137/613 |

FOREIGN PATENT DOCUMENTS

| | | |
|---|---|---|
| DE | 3315972 | 11/1984 |
| DE | 373 9048 | 5/1989 |
| DE | 689 09 349 | 1/1994 |
| DE | 10303856 | 4/2004 |
| EP | 0354123 | 2/1990 |
| EP | 1126218 | 8/2001 |
| EP | 1158182 | 11/2001 |
| WO | WO 89/04935 | 6/1989 |

* cited by examiner

*Primary Examiner*—John K Fristoe, Jr.
(74) *Attorney, Agent, or Firm*—Reed Smith LLP

(57) ABSTRACT

The present invention provides a gas valve arrangement having at least one main valve that has a valve closure element which is connected with a fluid-actuated drive device. A pilot valve is connected to the drive device so as to control it by a pilot fluid flow, and which has a piezoelectric actuation element for influencing the pilot fluid flow. A control device is connected with the pilot valve and acts on it with an alternating voltage so as to open the main valve.

21 Claims, 4 Drawing Sheets

VALVE ARRANGEMENT WITH PIEZOELECTRIC CONTROL

CROSS-REFERENCE TO RELATED APPLICATION

This application claims priority of German Application No. 10 2005 018 730.7, filed Apr. 22, 2005, the complete disclosure of which is hereby incorporated by reference.

FIELD OF THE INVENTION

The invention concerns a valve arrangement which is suitable, in particular, for gas applications.

BACKGROUND OF THE INVENTION

To control fluid flows, servo valves that are controlled by a pilot valve are frequently used. Such a valve arrangement can be found, for example, in DE 100 06 600 B4. This valve arrangement has a main valve with a valve closure element associated with a valve seat. A spring clamps the valve closure element against the valve seat. To open this main valve, a fluid-actuated drive device in the form of a diaphragm is used. The fluid-actuated drive device is located in a housing element and connected with the valve closure element via a valve rod. For the controlled and guided pressure action of the diaphragm and the generation of a force that opens the main valve, an electromagnetic pilot valve is provided that is designed as a switch valve. It connects either the two chambers, divided by the diaphragm in the housing, with one another, or in its other switch position, it connects one of the chambers with the discharge side of the valve. In this way, it is possible to open or close the valve arrangement with small electrical outputs. To keep the valve arrangement open, however, the electromagnet of the pilot valve must be constantly supplied with current. Even if a holding current reduction is effected, this leads to non-negligible power consumption. This cannot be reduced arbitrarily either. For safety reasons, the pilot valve must switch into the position required for bringing the valve arrangement safely to the closed position if there is a power failure. To this end, a corresponding restoring spring is required that can reliably overcome all residual forces that can appear in a magnetic circuit. The holding current of the pilot valve must be dimensioned correspondingly large, so as to overcome, in turn, the closure spring in the operated state.

An on/off valve with intermediate values cannot be adjusted over the long term. Moreover, such a valve arrangement does not permit any modulation of the gas flow. If gas devices with varying power consumption are to be controlled by such a valve, additional modulation valves are required.

On the basis of this, the objective of the invention is to create an improved valve arrangement that improves on the aforementioned valve arrangement in at least one respect.

This objective is attained by the valve arrangement in accordance with the invention, and also by the valve control method in accordance with the invention.

SUMMARY OF THE INVENTION

The valve arrangement in accordance with the invention has a pilot valve designed as a piezoelectric valve, which is acted upon to open the main valve by a control device with an alternating voltage. This represents a safety feature per se. An error in the control device leads, with a certain degree of safety, to the discontinuation of the starting alternating voltage. If this is conducted to the piezoelectric actuation element via a potential-separating element, for example, a transformer or a coupling capacitor, then with the appearance of an electrical error, such as permanent direct voltages, for example, these cannot reach the piezoelectric actuation element and cannot move it to a permanently open position. Thus, only alternating voltage signals can bring about opening of the pilot valve and accordingly, opening of the main valve. The frequency of the alternating signals is preferably selected to be at least large enough so that the connected servo valve integrates oscillations caused by the pulsating of the pilot valve and the pilot gas flow—that is, it no longer follows them or no longer follows them in a relevant manner.

The use of a pilot valve with a piezoelectric actuation element offers an additional advantage: the output required for opening and closing the pilot valve is very small. Thus, the power consumption of the valve arrangements is reduced, which enables battery-operated applications. Furthermore, the heat produced in the valve is also lowered with the absorbed thermal power loss, which is helpful for miniaturization of the construction design.

The operation of the pilot valve with an alternating voltage opens up the possibility of using the main valve not only as an on/off valve, but, moreover, as a modulation valve, with which it is possible to adjust intermediate positions between the open position and the closed position. With a corresponding infinitely variable adjustment of the control signal of the pilot valve, it is thus possible to attain an infinitely variable adjustment of the main valve. For adjustment of the throughput of the pilot valve, it is possible to change the control amplitude of the alternating voltage or its frequency. However, it is preferable to work with a constant frequency and amplitude and rectangular wave signals, the pulse duty factor of which is changed in accordance with a specification signal. Therefore, it is possible to control the pilot fluid flow and thus also the opening of the main valve via the pulse-pause ratio of the alternating voltage controlling the pilot valve. This can consequently be used as a modulation valve, wherein it can perform its function as a gas safety valve. This is especially true if it is normally held in the closed position by a closure spring and is activated only by an active opening of the pilot valve by triggering it with an alternating signal (i.e., transforming to the open position). Such a valve arrangement can be operated, for example, within the framework of a regulation device as a pressure regulator or as a throughflow regulator, so as to produce a desired constant gas pressure or a desired prespecified gas flow. To this end, the control device is connected with a pressure sensor or flowmeter, placed at a suitable site.

If the alternating voltage has a rectangular wave signal form, the corresponding alternating voltage signal can be produced in a simple manner with little loss. If the work is done, moreover, with a constant frequency, which preferably lies above the audio frequency, then the operation of the pilot valve is inaudible. Furthermore, the opening and closing intervals of the piezoelectric actuation element follow at such a high speed that the pilot fluid flow is uniform and the drive device of the main valve does not vibrate. In the long run, this is achieved in that the drive device forms a mechanical low-pass filter, wherein the operating frequency of the pilot valve lies far above its cutoff frequency.

The modulation of the pilot valve and thus also the opening of the main valve by modulation of the pulse duty factor of the alternating voltage can take place in stages, in a more or less infinitely variable manner or it can be infinitely variable.

Preferably, a component that permits a galvanic current flow is connected parallel to the piezoelectric actuation element. In the simplest case, a resistor can be used for this, which in the event of error removes charges sitting on the piezoelectric element. Such a resistor, however, is always associated with power losses. If the piezoelectric pilot valve is designed such that, based on the model, a gas flow can result only if the piezoelectric actuation element oscillates, one can eliminate a current path parallel to the piezoelectric actuation element. If such certitude, based on the model, does not exist, however, it may be advantageous to connect an inductive component, for example, a coil, parallel to the piezoelectric actuation element. Preferably, it forms with the piezoelectric component a parallel oscillator circuit, the resonance frequency of which is less than or equal to the frequency of the controlling alternating voltage. Thus, it is possible that only a small parasitic current flow appears due to the inductive component and the electric losses are kept low. In the resonance case, the supply current that the control device must produce is particularly low and free of reactive power. Furthermore, relatively high oscillation amplitudes can be achieved at the piezoelectric actuation element with low control currents. In the event of error, however, the coil produces an immediate discharge of the piezoelectric actuation element—that is, short circuits it—so that it returns to a relaxed state almost instantaneously. If the pilot valve is designed such that it only oscillates if it is in electrical resonance with the connected coil, then the control frequency must also match the resonance frequency relatively well in order to open the pilot valve. This in itself has the advantage of additional safety. The pilot valve remains closed if no voltage is applied, if any voltage is applied, or if an oscillation with a frequency deviating from the resonance frequency is applied. An error situation in which the precise resonance frequency is produced in a random but undesired way is very improbable.

The piezoelectric component is preferably a flexural resonator. With an oscillation frequency of ten kilohertz or so, it is possible to achieve a sufficient stroke with it so as to release gas flows suitable for the control of gas valves. Gas valves can be set up in a way that is suitable for the control of gas flows in the range of a few kilowatts to over one hundred kilowatts.

As flexural resonators, one uses piezoceramic strips or beams whose flat sides carry electrodes. To obtain greater strokes, it may be advantageous to provide, instead of a traditional flexural resonator, a flexural resonator that has an essentially longitudinally unchangeable element, and arranged parallel to this and connected with it, a longitudinally changeable piezoelectric stack. This arrangement has the advantage of attaining high deflections with low control voltages, so that relatively large pilot gas flows can be controlled.

In a particularly preferred embodiment, the pilot valve has two alternating releasable outlets, which are both closed when the pilot valve is at rest—that is, without activation of the valve. By control of the piezoelectric actuation element with a positive or negative polarity, only one or the other of the outlets is released. The two outlets can thus not be nested simultaneously but rather only over time—that is, they are released alternatingly. This is achieved, for example, in that both outlets of the pilot valve are controlled by a single piezoelectric actuation element, for example, a flexural oscillator, which, under activation, is bent in one direction or another, alternatingly. If it carries two valve closure elements, for example, one on its free end and another, approximately in the middle on the same side, it is possible to release the corresponding outlets by these two valve closure elements alternatingly if the flexural resonator oscillates. With such a pilot valve, it is possible, for example, to control two successively situated main valves. The two main valves receive gas only when the flexural resonator oscillates. The two outlets of the pilot valve then intermittently deliver, in quick succession, small gas portions that combine to form a pilot gas flow for the control of the first or the second main valve. If the oscillation fails or the pilot valve remains in one position, because, for example, a direct voltage arrives at the piezoelectric actuation element, gas is waiting at not more than one of the pilot outlets, so that, at most, one of the two main valves remains open. The other one closes for certain. Thus, even in the event of a catastrophic error that leads to a total failure of the pilot valve, at least one of the main valves, connected in series, is closed. Thus the valve arrangement, which opens only if the piezoelectric actuation element of the pilot valve oscillates, offers an extremely high degree of safety.

Moreover, the two main valves, lying in series, can be controlled separately from one another with pulse width modulation by the oscillating switching pilot valve. To this end, for example, a bipolar alternating voltage is used whose positive and negative wave can be pulse-width-modulated, separately from one another. Thus, it is possible to control the two main gas valves, arranged in series, separately from one another, wherein, for example, a very large regulation range, ignition gas operation, or other types of operation can be implemented. For example, the first valve can be used as a pressure regulator and the second one as a modulation valve.

It is also possible to connect a magnetically actuated on/off valve upstream or downstream from the two piezo-controlled main valves or to replace one of the main valves by such a valve. In this way it is possible to connect the known and recognized safety features of inexpensive magnetic valves with the possibilities of good controllability of the piezo-controlled servo valves. For example, the magnetic valve provides the classification into the desired safety class, and with the main valve(s) controlled by the piezo-pilot valve, it is possible to establish the desired gas pressure and/or the desired throughflow.

With a modified embodiment of the pilot valve, the interior, enclosed by the housing of the pilot valve, serves as a buffer. An inlet, which is correlated with a valve closure element, leads into the housing. An outlet, which is also correlated with a valve closure element, leads out of the housing. The two valve closure elements are, for example, moved by the same piezoelectric element, wherein if the actuation element is not activated the two valve closure elements sit on their respective valve seats—that is, is relaxed and at rest. The actuation organ is preferably a flexural resonator. Since the two valve closure elements are arranged on the flexural resonator at a distance from one another, the inlet can be opened if the flexural resonator bends in one direction, whereas the inlet is closed and the outlet is opened when the actuation element bends in the opposite direction. In this way, only the inlet or the outlet can be alternatingly released. If such a pilot valve is acted on with gas pressure on the inlet side, a small gas portion is introduced into the interior whenever the inlet is opened and this gas portion is again discharged from the outlet whenever the inlet is closed and the outlet is opened. The magnitudes of the individual gas portions permitted through are controlled by the magnitude—that is, the capacity—of the interior of the housing of the pilot valve and the prevailing gas pressure.

Such a pilot valve can be used for the direct control of small gas flows and also for the control of servo valves. It has the advantage that it allows gas through only if the actuation element oscillates. A deflection of the actuation organ in only one direction or in only the other direction does not produce a permanent gas flow but rather only the introduction or discharge of a minimal gas portion. The magnitude of the gas flow can be regulated by influencing the oscillation frequency and/or the pulse duty factor of the control signal of the actuation element. In this sense, the valve can also be used as a gas meter. With a given gas pressure, the number of oscillation cycles corresponds to a gas quantity that has passed through.

BRIEF DESCRIPTION OF THE DRAWINGS

Other details of advantageous embodiments of the invention can be deduced from the drawings, the description, or the claims. Embodiments of the invention are illustrated in the drawings. The figures show the following:

DETAILED DESCRIPTION OF THE DRAWINGS

Figure 1:
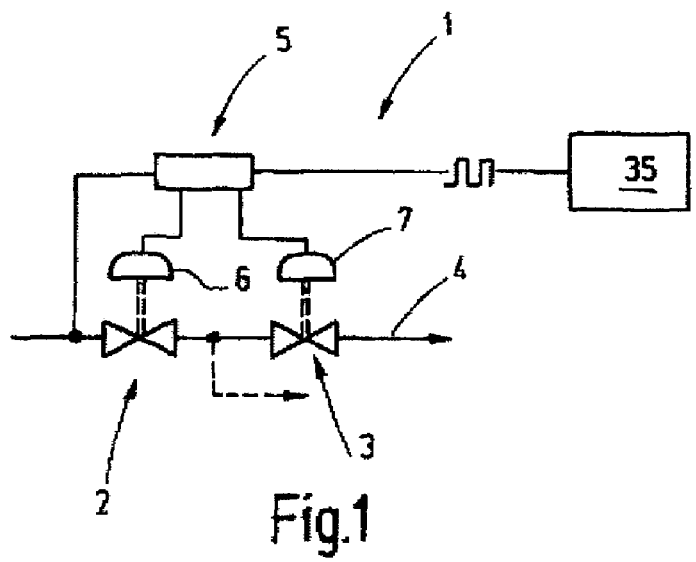
FIG. 1 illustrates the valve arrangement according to the invention in a schematic overview representation.
Figure 2:
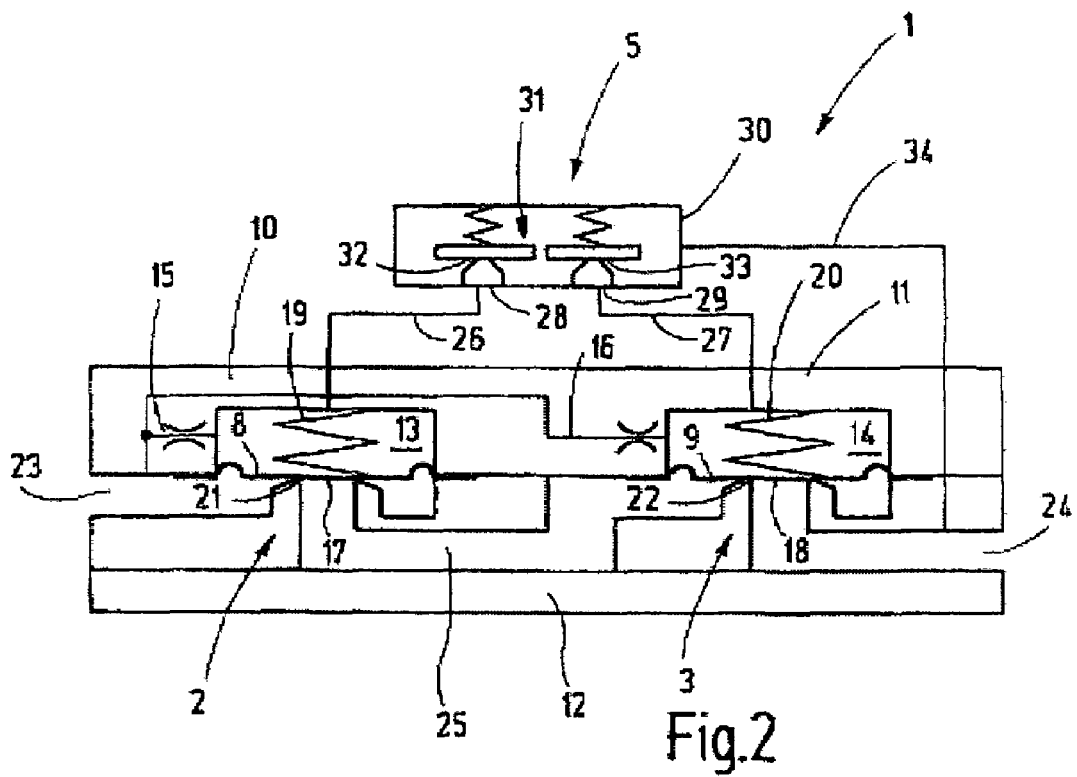
FIG. 2 illustrates a valve arrangement according to FIG. 1, in a schematic section, when closed.

In FIG. 1, a valve arrangement 1 is illustrated that in principle can be used for the control of various fluid media, in particular, however, for the control of a gas flow. At least one, but preferably two main valves 2, 3, which are arranged behind one another in a conduit 4, belong to the valve arrangement 1. The main valves 2, 3 are controlled by a common pilot valve 5, which is designed as a separate subassembly or can be combined with one of the main valves 2, 3 or with both main valves 2, 3, to form a subassembly. The main valves 2, 3, can, for example, be accommodated in one common housing. They are designed as so-called servo valves and have a drive device 6, 7 for that purpose, which can be formed by a diaphragm 8, 9 as shown in FIG. 2. The diaphragm 8, 9 is located in a housing 10, 11. This can be part of a valve housing 12, as shown in FIG. 2. The housings 10, 11 can, however, also be separate from the valve housing 12. The diaphragms 8, 9 divide at least one working chamber 13, 14 in the housings 10, 11, which are connected with a section of the conduit 4, lying upstream with respect to the main valves 2, 3, so they are throttled via fluid channels 15, 16.

The diaphragms 8, 9 are, for example, connected via connecting rods or valve spindles with a valve closure element 17, 18. Alternatively, the valve closure elements 17, 18 can be formed by a central section or part of the diaphragm 8, 9 or a part connected directly with the diaphragm 8, 9, as shown in FIG. 2.

Moreover, valve closure springs 19, 20 are provided, which bias the valve closure elements 17, 18 against valve seats 21, 22. Thus, the path from the inlet 23 to the outlet 24 of the valve arrangement 1 is blocked by two main valves 2, 3. An intermediate chamber 25 is formed between the main valves 2, 3. Suitable sensors, which are not depicted further, can be placed in or on this intermediate chamber. For example, a throughflow sensor can be used to record the throughflow. With the aid of the recorded throughflow value, it is possible to regulate a desired throughflow value, for example, with the valve 3.

It is also possible to record the pressure in the chamber 25 and to stabilize it to a desired, for example, temporarily constant, value with the valve 2. A desired throughflow can then be adjusted, for example, with the valve 3 by setting it to an appropriate opening value in accordance with its known characteristic curve. With an appropriately more precise pressure regulation in the chamber 25 and a precisely known characteristic curve used as a basis and saved, for example, it is possible then to regulate and adjust the desired throughflow rather precisely with the valve 3.

The working chambers 13, 14 are connected with a first and a second inlet 28, 29 of the pilot valve 5 via suitable conduits or channels 26, 27. It has a housing 30, in which one or more piezoelectric actuation elements 31 are located. They fit closely against valve seats with a flat area 32, 33 formed as a valve closure element; the seats are with the inlets 28, 29. The spring effect on the actuation elements 31 is illustrated in FIG. 2 by a spring symbol. A channel, which is connected with the discharge side of the valve arrangement 1—that is, the outlet 24—via a conduit 34, leads out of the housing 30.

The valve arrangement 1 is connected to a control device 35 that controls the piezoelectric actuation element 31. The latter is, for example, a flexural resonator that is supplied with an alternating voltage by the control device 35 to open the main valves 2, 3. This is applies both if the surfaces 32, 33 are provided on one and the same piezoelectric actuation element 31 and also if they are provided on separate actuation elements.

In both cases, the actuation element(s) are controlled such that the surfaces 32, 33 move in an opposite direction—that is, the inlets 28, 29 are alternatingly released.

The valve arrangement 1 described to this extent works as follows:

At rest, when the control device 35 does not emit any voltage signals, both surfaces 32, 33 of one or both actuation elements 31 lie closely against the associated valve seats and thus close the inlets 28, 29. The working chambers 13, 14 are thus blocked off with respect to the outlet 24. They are, on the other hand, acted on with fluid pressure via the fluid channels 15, 16; the fluid pressure acts in the same direction as the valve closure springs 19, 20. Thus both valve closure elements 17, 18 sit on the valve seats 21, 22 providing closure. The valve arrangement 1 is closed.

To open the valve arrangement 1, the control device 35 sends an alternating voltage signal to the actuation element 31 (or the actuation elements, if several are present) so that they oscillate. This is illustrated schematically by arrows 36 in FIG. 3. The surfaces 32, 33 thus lift periodically from their individual valve seats. The actuation element 31 thereby oscillates, preferably at an inaudible frequency above 20 kHz or below 20 Hz or 16 Hz—that is, with an ultrasonic or subsonic frequency. The inlets 28, 29 are thus released, that is, they are connected with the outlet 24 via the conduit 34. The flow resistance of the released channel is low—in any case, lower than the flow resistances of the channels 15, 16. In this way, the gas pressure in the working chambers 13, 14 declines and the fluid pressure next to the inlet 23 can move the diaphragm 8, 9 in the opening direction. The valve closure elements 17, 18 lift off from their valve seats 21, 22 and release the gas flow.

By influencing the pulse duty factor of the oscillation, which is performed by the actuation element 31 (or the actuation elements 31), the discharge resistance with which the fluid or gas are discharged from the working chamber 13, 14 can be varied. In this way, the position of the valve closure elements 17, 18 can be purposefully regulated, so as to neither completely release the gas flow nor completely block it, but rather to throttle it in a desired manner, so as to achieve, for example, a constant gas pressure or a constant gas flow. If a pressure sensor is connected to the intermediate chamber 25, then the main valve 2 can be used as a pressure regulator to maintain a constant gas pressure in the intermediate chamber 5. The main valve 3, following in the flow direction, can then be used, for example, as a quantity regulator, in order to regulate the gas flow proceeding from a constant preliminary pressure in the intermediate chamber 25.

Figure 4:
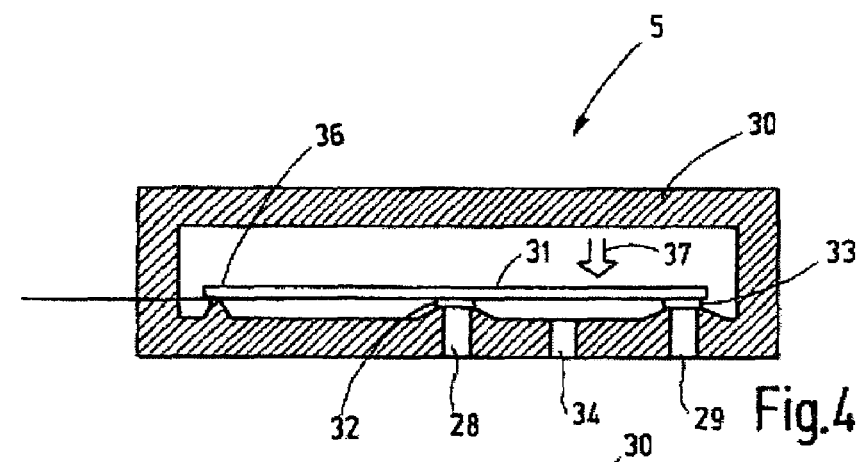
FIG. 4 illustrates the pilot valve of the valve arrangements according to FIGS. 1 to 3, in a schematic longitudinal section, when at rest.
Figure 5:
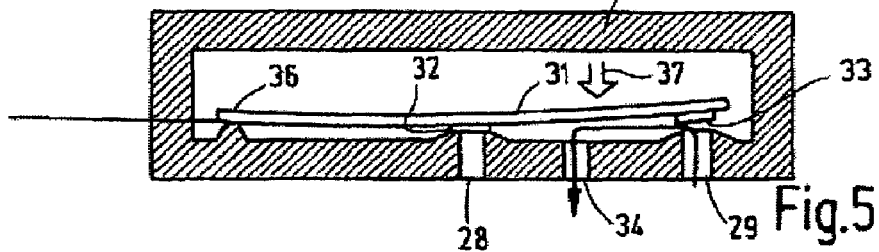
FIGS. 5 and 6 shows the pilot valve according to FIG. 4, in a schematic longitudinal section, in various oscillation phases.
Figure 6:
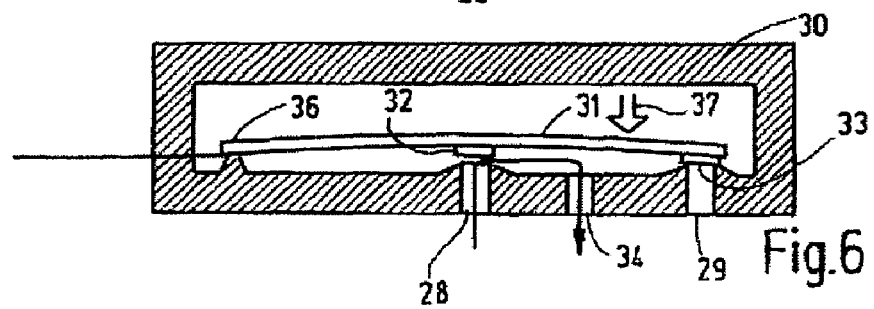

FIG. 4 illustrates a preferred embodiment of the pilot valve 5. The actuation element 31 is formed by a piezoelectric flexural resonator that is connected at one end 36 with the housing 30, and is firmly clamped there, for example. The piezoelectric resonator is, for example, formed by a narrow flat strip made of piezoceramic material. It is provided with electrodes and thereby is designed such that it bends in a first direction when acted on with a voltage of a first polarity, as illustrated by FIG. 5, while it bends in the opposite direction when connected to a voltage with a reverse polarity, as FIG. 6 illustrates.

The surfaces 32, 33 are, for example, formed on smaller projections located on a common flat side of the actuation element 31. They close the inlets 28, 29 when the actuation element 31 is stress-free. This state is illustrated in FIG. 4.

If the actuation element 31 is connected to a voltage of a first polarity, the surface 33 lifts off of the associated valve seat and the inlet 29 is released. The piezoelectric actuation element 31 is thereby supported by the surface 32 on the valve seat of the inlet 28, which thus remains closed.

If the piezoelectric actuation element 31 is acted on with an opposing voltage, it bends in the opposite direction. It is then supported by its surface 33, on the valve seat of the inlet 29, while the surface 32 lifts off of the valve seat of the inlet 28. Thus, the inlet 28 is released, whereas the inlet 29 remains closed.

The actuation element 31 is loaded with a bias, in the direction of the inlets 28, 29. This bias is symbolized by an arrow 37 in FIGS. 4, 5, and 6. Depending on the control device, the bias load is thus supported via the surface 32 or the surface 33. If there is no activation, the bias load is transferred, in accordance with arrow 37, via two surfaces 32, 33.

The bias can be produced by a separate spring element or by the elasticity inherent in the actuation element 31.

Figure 3:
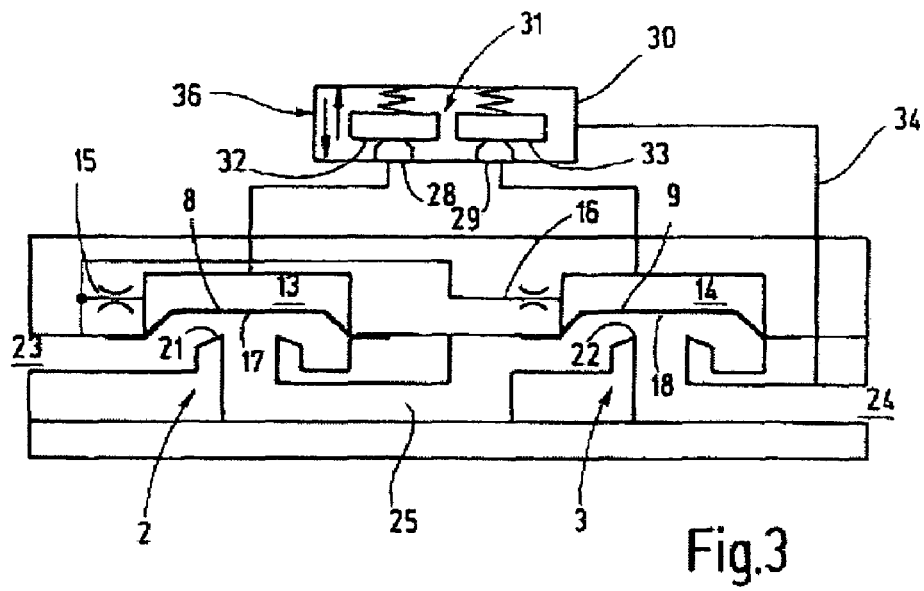
FIG. 3 shows the valve arrangement, according to FIG. 2, in schematic section, when open.

The pilot valve 5, in accordance with FIGS. 3 to 6, is suitable, in particular, for the control of the main valves 2, 3 according to FIGS. 2 and 3. The two working chambers 13, 14 are pressure-relieved if the actuation element 31 oscillates. If it does not oscillate, but rather persists in one or the other position, according to FIG. 5 or FIG. 6, at least one of the main valves 2, 3 is closed. Thus, every failure of the control device 35 leads to the closure of at least one of the valves 2, 3. At the latest when the piezoelectric actuation element 31 was discharged by external resistors, by an internal resistor, or by other means, and assumes the state according to FIG. 4, both main valves 2, 3 are closed.

Figure 11:
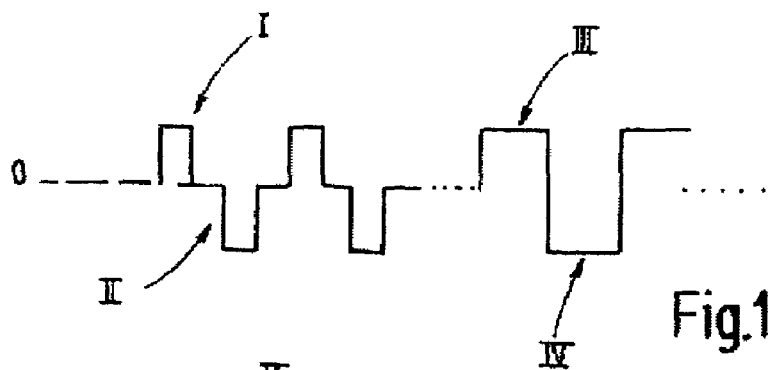
FIGS. 11 and 12 illustrates the various control signals for the piezoelectric actuation element of the pilot valve according to FIGS. 4 to 6.
Figure 12:
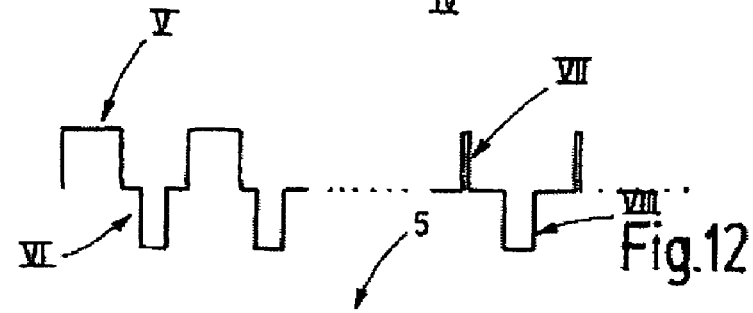

Activation of the actuation organ 31 can be effected with an alternating voltage according to FIGS. 11 and 12. The alternating voltage is preferably bipolar—that is, it has a positive wave I and a negative wave II, with regard to the reference voltage zero. The positive wave I controls, for example, the bending of the actuation element 31 according to FIG. 5, whereas the negative wave II influences the bending of the actuation organ 31 according to FIG. 6. Both waves I, II can be modulated with respect to their pulse-pause ratio, as the wave trains III, IV show. As FIG. 12 illustrates, the wave trains V, VI can assume different pulse-pause ratios. Accordingly, the gas discharges through the inlets 28, 29 can be controlled independently of one another. For example, as waves VII, VIII show, the opening of one of the valves can be almost dispensed with or can also be dispensed with entirely, so that the actuation element 31 opens only one of the main valves 2, 3 and leaves the other one closed.

Figure 7:
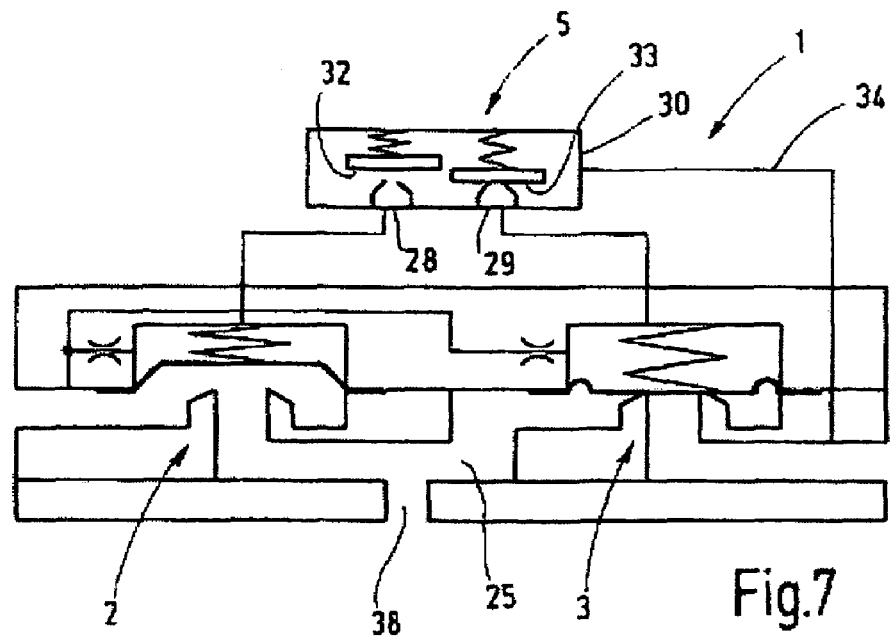
FIG. 7 illustrates a modified valve arrangement with pilot valve and two main valves, in a schematic longitudinal section in ignition gas operation.

The latter can be used in the modified embodiment of the valve arrangement 1 according to FIG. 7. With it, ignition gas is conducted out of the intermediate chamber 25 via a connection 38. The pilot valve 5 is oscillatingly actuated, with the control alternating voltage, for example, being asymmetrical in accordance with FIG. 12, such that only the upstream main valve 2 is still open, but the main valve 3 remains closed. Ignition gas can be conducted out via the connection 38, wherein, in addition, the ignition gas quantity can be controlled by modulation of the opening of the main valve 2. The modulation can be undertaken by stipulation of a suitable pulse duty factor of the curve path VIII (FIG. 12), which is used to control the main valve 2.

Figure 8:
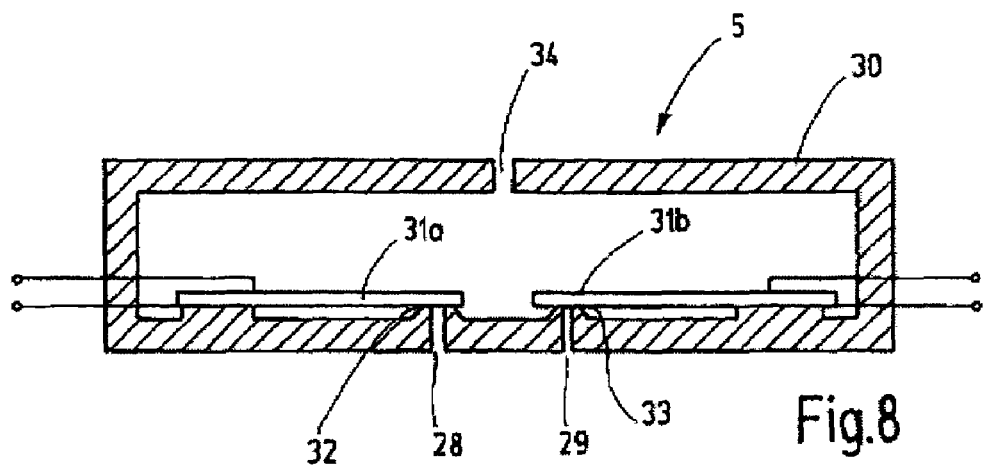
FIG. 8 shows a modified pilot valve with two separate piezoelectric actuation elements, in a schematic longitudinal section.

FIG. 8 illustrates an embodiment for a pilot valve 5 that has two actuation elements 31a, 31b, which can be controlled independently of one another and which are connected at corresponding outlets of the control device 35. Both control elements 31a, 31b have the already discussed surfaces 32, 33 to close the inlets 28, 29 associated with them. In the relaxed state, the actuation elements 31a, 31b close the inlets 28, 29. For the activation—that is, the release of the inlets 28, 29—the actuation elements 31a, 31b are given an oscillating movement, wherein via the frequency and/or the pulse duty factor and/or the amplitude, the flow resistance is regulated at the individual valve seat. Otherwise, the previous description applies.

Figure 9:
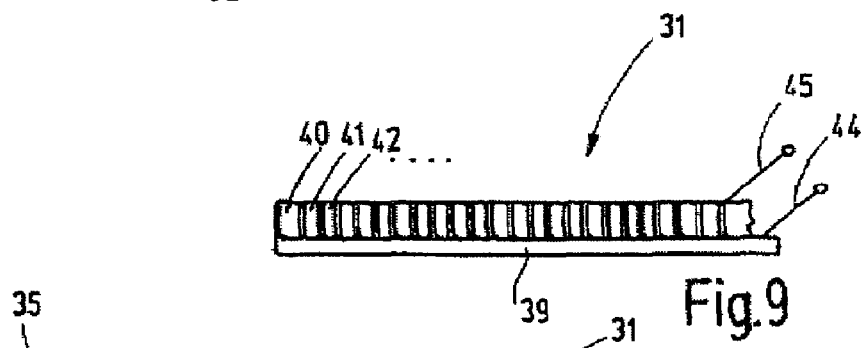
FIG. 9 illustrates a piezoelectric actuation organ in a schematic cutaway representation.

FIG. 9 illustrates the structure of the actuation element 31 in an embodiment example. It consists of a carrier 39, which is designed oblong and strip-shaped and is arranged horizontally in FIG. 9. The flexible but hardly extensible—that is, rigid—carrier 39 is, for example, a metal tongue or also a ceramic tongue. A stack structure, consisting of individual piezoelectric elements 40, 41, 42, and so forth, is placed on the tongue; the elements change their thickness when voltage acts on them; the thickness is measured with reference to the longitudinal direction (horizontal in FIG. 9) of the carrier 39, which is parallel to it. The individual piezoelectric elements 40 to 42 are separated from one another by insulation layers and are provided with two electrodes. The left electrodes in FIG. 9 are connected to a first conductor 44. The right electrodes of each piezoelectric element 40 to 42 in FIG. 9 are connected to a second conductor 45. The piezoelectric elements 40, 41, 42 are arranged in alternating fashion between the interdigitated electrodes of the conductors 44, 45 which mesh comb-like into one another, and between the aforementioned insulation layers.

With low applied control voltages, such a stack structure exhibits a relatively large longitudinal change, which is converted into a bending movement by the firm connection to the carrier 39.

Figure 10:
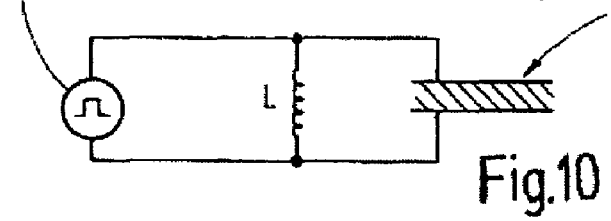
FIG. 10 shows an electrical resonance circuit with a piezoelectric actuation element as a circuit diagram.

FIG. 10 illustrates the electric wiring of the piezoelectric actuation element 31, which has outer electrodes and even forms an oscillatable system. It is connected with an external inductance L to form an oscillation circuit with the capacitance of the actuation element 31; its resonance frequency is at or below the frequency of the connected alternating voltage supplied by the control device 35. With discontinuation of the stimulation by the control device 35, the inductive element L short-circuits the actuation element 31—that is, it affects its discharge and thus the return to its stretched position in which the connected valves are closed.

Figure 13:
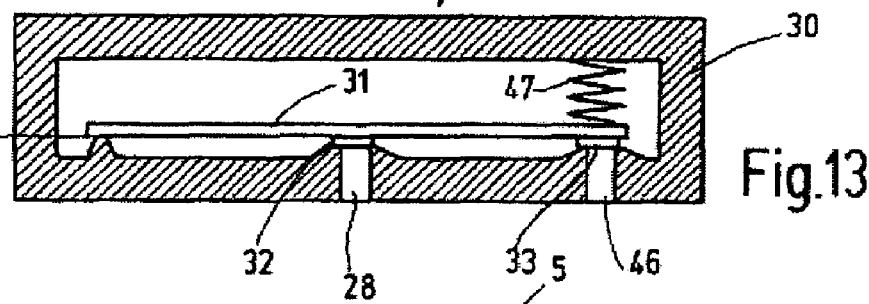
FIG. 13 shows an alternative embodiment of a pilot valve for the control of small gas flows.
Figure 14:
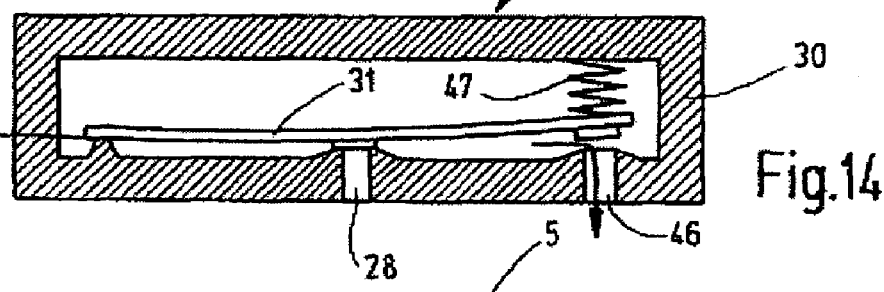
FIG. 14 illustrates the valve according to FIG. 13 in a first oscillation phase.
Figure 15:
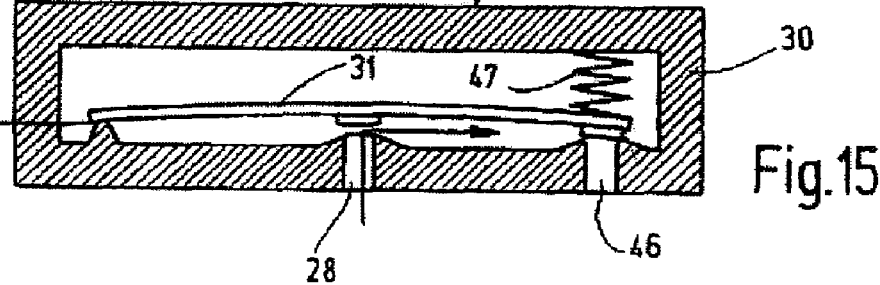
FIG. 15 illustrates the valve according to FIG. 14 in a second oscillation phase.

FIGS. 13 to 15 illustrate another developed embodiment of the pilot valve 5, which can be used for control of an individual main valve 2, and, in a double model, for control of two main valves 2, 3. Moreover, it can be used for the direct control of relatively small, for example, high-energy gas flows, for example, with small propane apparatuses. The structure of this pilot valve 5 largely corresponds to that of the pilot valve 5 according to FIGS. 4 to 6, with, however, the absence of the outlet leading to the conduit 34. From the connections 28, 29, for example, the connection 28 is, as before, the inlet, whereas the other connection 29, also designated in the preceding as an inlet, is now designated with 46 and forms an outlet. Otherwise, the preceding description is applicable without limitation. In the at-rest state, the actuation element 31 closes, with its surfaces 32, 33, both the inlet 28 and also the outlet 46. The actuation element 31 fits closely, with bias, on the corresponding valve seat. The bias is brought about by a spring 47, marked in FIGS. 13 to 15, wherein this spring can be provided and designed as a separate element, and can also be formed by the bias of the actuation element 31 itself.

The inlet 28 and the outlet 46 cannot be released simultaneously. They can be opened only alternatingly, in that the actuation element 31 is deflected in one direction or the other. FIG. 14 illustrates the release of the outlet 46 with a simultaneously closed inlet 28. FIG. 15, on the other hand, illustrates the release of the inlet 28 with a simultaneous closure of the outlet 46.

This pilot valve 5 works as follows:

In the rest state, the actuation element 31 is not stimulated. It does not oscillate. The pilot valve 5 overall is closed. If a bipolar alternating voltage is applied to the actuation element 31, for example, according to one of the curve forms of FIG. 11 or 12, it oscillates, wherein the inlet 28 and the outlet 46 open alternately. In the phase of a polarity which is illustrated in FIG. 15, a gas portion is introduced, via an increase in pressure into the interior volume of the housing 30. If the control signal alternates its polarity, the actuation element 31 oscillates into its other position, in accordance with FIG. 14. The inlet 28 is then closed and the outlet 46 opened, wherein the gas portion received by the housing 30, via a reduction in pressure, is again released via the outlet 46.

Control of this pilot valve 5 is preferably affected with a symmetrical alternating voltage, for example, in accordance with FIG. 11, right. If the gas flow is to be throttled, one goes over, for example, to a curve form in accordance with FIG. 11, left, wherein the opening times of the inlet 28 and the outlet 46 are smaller, and thus the gas portions permitted through become smaller. Thus, the gas flow can be controlled in an infinitely variable manner by the pilot valve 5.

Moreover, it is possible to control the gas flow by increasing or decreasing the control frequency and thus the oscillation frequency of the actuation element 31. Because precisely one gas portion is permitted through with each oscillation cycle, the gas flow becomes larger with increasing frequency. Likewise, it can be influenced to a lesser extent by the influence of the oscillation amplitude.

The pilot valve 5 according to FIGS. 13 to 15 is intrinsically safe. It cannot be opened by gas pressure pressing either forwards or backwards. At least one of the two partial valves at the inlet 28 or outlet 46 is closed. Furthermore, it cannot be opened either by application of a direct voltage in one or the other direction (polarity). For the release of a gas flow, the application of an alternating voltage is required that leads to a sufficiently large oscillation of the actuation element 31, preferably in the ultrasonic range. The pilot valve 5 is suitable for metering small gas flows or other compressible fluid media. Incompressible media (water, oil) can be controlled with this valve if the housing 30 is elastic, if it has an elastic section, or if another elastic buffer is present between the inlet and the outlet.

A valve arrangement has a pilot valve 5 with a piezoelectric actuation element 31 to provide control. The pilot valve 5 is activated with an alternating voltage, so that its actuation element 31 oscillates to release a gas flow.

While the invention may be susceptible to various modifications and alternative forms, specific embodiments have been shown by way of example in the drawings. However, it should be understood that the invention is not intended to be limited to the particular forms disclosed. Rather, the invention is to cover all modifications, equivalents and alternatives falling within the spirit and scope of the invention as defined by the following appended claims.

We claim:

1. A valve arrangement comprising:
   at least one main valve that has a valve closure element which is connected with a fluid-actuated drive device;
   a pilot valve that is connected to the drive device so as to control it by a pilot fluid flow, and which has a piezoelectric actuation element for influencing the pilot fluid flow;
   a control device that is connected with the pilot valve and acts on it with an alternating voltage so as to open the one main valve; and
   a second main valve arranged successively with the one main valve, where both main valves are controlled by the fluid-actuated drive device.

2. The valve arrangement according to claim 1, characterized in that the alternating voltage has a rectangular wave signal form.

3. The valve arrangement according to claim 2, characterized in that the control device is set up to modulate the pulse duty factor of the alternating voltage.

4. The valve arrangement according to claim 1, characterized in that an inductive component is connected in parallel with the piezoelectric actuation element.

5. The valve arrangement according to claim 4, characterized in that the alternating voltage has a frequency which matches the resonance frequency of the parallel oscillation circuit formed from the piezoelectric actuation element and the inductive component, or lies above the same.

6. The valve arrangement according to claim 1, characterized in that the frequency of the alternating voltage lies above or below audio frequency.

7. The valve arrangement according to claim 1, characterized in that the piezoelectric component is a flexural resonator.

8. The valve arrangement according to claim 7, characterized in that the flexural resonator has a piezoelectric element stack, whose length is piezoelectrically changeable.

9. The valve arrangement according to claim 8, characterized in that the piezoelectric element stack is connected on one side to a rigid carrier element that extends parallel to the longitudinal direction of the piezoelectric element stack.

10. The valve arrangement according claim 1, characterized in that the pilot valve has two alternately releasable connections that are connected with the drive devices of the main valves.

11. The valve arrangement according to claim 1, characterized in that the piezoelectric actuation element of the pilot valve controls both connections of the pilot valve.

12. The valve arrangement according to claim 11, characterized in that the piezoelectric actuation element carries valve closure surfaces on places separated from one another on one and the same side.

13. The valve arrangement according to claim 1, characterized in that the piezoelectric actuation element is a flexural resonator, which is deflected to a first direction for the release of one of the connections, and is deflected to the other direction for the release of the other connection, so that only one or the other connection is released.

14. The valve arrangement according to claim 1, characterized in that the control device is set up for the delivery of a bipolar alternating voltage.

15. The valve arrangement according to claim 14, characterized in that the alternating voltage can be pulse-width-modulated for at least one polarity.

16. The valve arrangement according to claim 1, characterized in that a sensor that is connected with the control device is located in or on a chamber following the one main valve.

17. The valve arrangement according to claim 16, characterized in that the sensor is a pressure sensor and that the control device regulates the pressure prevailing in the chamber by means of the one main valve.

18. The valve arrangement according to one of claims 1 and 17, characterized in that the control device adjusts the second main valve for the adjustment of desired gas flows, in accordance with its characteristic throughput curve, to positions corresponding to the desired gas flows.

19. The valve according to claim 1, characterized in that an electromagnetically actuated valve is connected upstream or downstream from the one main valve.

20. The valve according to the claim 1, wherein the pilot valve for the control of small gas flows, with a piezoelectric actuation element is located in a housing and carries two valve closure surfaces, of which one is associated with an inlet leading into the housing, and the other one to an outlet, leading out of the housing, wherein both the inlet and the outlet are to be alternately released by the actuation element.

21. A valve arrangement comprising:
a main valve having a valve closure element coupled to a fluid-actuated drive device;
a pilot valve coupled to the drive device, the pilot valve having a piezoelectric actuation element; and
a control device that is coupled with the pilot valve and provides an alternating voltage so as to open the one main valve; and
a second main valve arranged successively with the one main valve, where both main valves are controlled by the fluid-actuated drive device,
wherein the piezoelectric actuation element modifies the pilot fluid flow.

* * * * *